(12) United States Patent
Forster

(10) Patent No.: US 10,545,713 B2
(45) Date of Patent: Jan. 28, 2020

(54) METHOD, SYSTEM, AND APPARATUS FOR RFID DRIVEN BI-STABLE DISPLAY ELEMENT

(75) Inventor: Ian James Forster, Essex (GB)

(73) Assignee: AVERY DENNISON RETAIL INFORMATON SERVICES LLC, Mentor, OH (US)

( * ) Notice: Subject to any disclaimer, the term of this patent is extended or adjusted under 35 U.S.C. 154(b) by 0 days.

(21) Appl. No.: 13/286,519

(22) Filed: Nov. 1, 2011

(65) Prior Publication Data
US 2013/0106805 A1 May 2, 2013

(51) Int. Cl.
*G06F 3/14* (2006.01)

(52) U.S. Cl.
CPC ................ *G06F 3/1431* (2013.01)

(58) Field of Classification Search
CPC .......... G06Q 20/3276; G06Q 20/3274; G09G 2380/04; G09G 3/18; G09G 2300/0473; G09G 2370/16; G09G 2380/06; G09G 3/04; G09G 3/34; G09G 3/3629; G06K 19/07703; G06K 19/07; G06K 19/0716; G06K 19/0723; G06K 7/10316; G06F 3/147; G06F 19/323; G07G 1/0045; H01Q 1/2216
USPC ... 340/572.1, 10.1, 10.3, 10.4, 10.51, 572.8; 345/519, 204
See application file for complete search history.

(56) References Cited

U.S. PATENT DOCUMENTS

| | | | |
|---|---|---|---|
| 7,492,258 B1 | 2/2009 | Shoarinejad et al. | |
| 7,689,459 B2 | 3/2010 | Johnson et al. | |
| 8,234,507 B2 * | 7/2012 | Zhu et al. .................... | 713/300 |
| 2001/0054005 A1 | 12/2001 | Hook et al. | |
| 2003/0156090 A1 | 8/2003 | Munn et al. | |
| 2005/0030157 A1 | 2/2005 | Capurso et al. | |
| 2006/0071925 A1 | 4/2006 | Wykoff et al. | |
| 2007/0030157 A1 | 2/2007 | Park | |
| 2007/0045399 A1 | 3/2007 | Martin | |
| 2007/0057793 A1 | 3/2007 | Alden et al. | |
| 2007/0120682 A1 * | 5/2007 | Rea et al. .................. | 340/572.8 |
| 2008/0198098 A1 | 8/2008 | Gelbman et al. | |
| 2008/0198903 A1 * | 8/2008 | Kawai .......................... | 375/135 |
| 2008/0303637 A1 | 12/2008 | Gelbman et al. | |

(Continued)

FOREIGN PATENT DOCUMENTS

EP 1779312 9/2008

OTHER PUBLICATIONS

"Ubiquitous Display", Liang-Han Lin; Da-Sheng Lee; Department of Energy & Refrigerating Air-Conditioning Eng., Nat. Tapiei University of Technology, Taipei, Taiwan (Oct. 13, 2010).

(Continued)

*Primary Examiner* — Chad M Dicke
(74) *Attorney, Agent, or Firm* — Avery Dennison Retail Information Services LLC

(57) ABSTRACT

A RFID device configured to drive a display element. The RFID device may have a reader capable of sending and receiving radio frequency signals and a RFID tag in communication with the RFID reader. The RFID tag may have an antenna, a chip having a radio frequency detector, a backscatter modulator, a logic block and a multiplexer. The RFID device may also have a display in communication with the multiplexer of the chip.

12 Claims, 2 Drawing Sheets

(56) References Cited

U.S. PATENT DOCUMENTS

| | | | |
|---|---|---|---|
| 2009/0201636 A1* | 8/2009 | Doherty | G06F 1/1626 361/679.26 |
| 2009/0240511 A1* | 9/2009 | Darrouzet | G06Q 10/08 705/1.1 |
| 2009/0243832 A1* | 10/2009 | Hyde et al. | 340/505 |
| 2009/0257473 A1* | 10/2009 | Tuttle | H04B 1/713 375/132 |
| 2010/0039410 A1 | 2/2010 | Becker et al. | |
| 2010/0079416 A1 | 4/2010 | Chung et al. | |
| 2010/0134257 A1* | 6/2010 | Puleston et al. | 340/10.4 |
| 2010/0201490 A1 | 8/2010 | Tseng | |
| 2011/0090060 A1* | 4/2011 | Tavshikar | G06K 7/0004 340/10.3 |
| 2012/0191147 A1* | 7/2012 | Rao et al. | 607/3 |
| 2012/0194322 A1* | 8/2012 | Batra | 340/10.33 |

OTHER PUBLICATIONS

"Passive RFID System with a Bistable Display", Dr. Ing. Stephan Guttowski; (2007).
"RFID Tags Deliver Letters Safely to Destination", Brussels, Times Higher Education (Dec. 26, 2010).
"Environmental Concerns Lead Deutsche Post to RFID", Rhea Wessel; Fraunhofer Institute for Reliability and Micro-integration (IZM) The University of Paderborn (Dec. 20, 2006).
International Search Report and Written Opinion dated Dec. 19, 2012 for International Application No. PCT/US2012/062536.

\* cited by examiner

METHOD, SYSTEM, AND APPARATUS FOR RFID DRIVEN BI-STABLE DISPLAY ELEMENT

BACKGROUND OF THE INVENTION

The use of radio frequency identification (RFID) type devices in electronic displays has grown significantly in recent years. Manually updating devices can be costly, time consuming, and prone to error. RFID devices allow manufacturers, distributors and retailers, amongst others, to quickly and easily change, update or modify the information displayed, and maintain this display even when power is removed from the device. These displays may generally be characterized as bi-stable and are often associated with passive RFID devices, which take power from Radio Frequency (RF) energy transmitted by an RFID reader.

However, electronic displays can be expensive due to power source requirements. For example, one problem with these displays is that in order to change the display, the device frequently requires complex voltage and time profiles. The circuitry needed to generate these waveforms adds complexity to the RFID chip and occupies too much space on the RFID chip as well. As a result, these RFID chips are often expensive to produce.

SUMMARY OF THE INVENTION

According to one exemplary embodiment, an RFID device configured to drive a display element may be shown. The RFID device may have a reader capable of sending and receiving radio frequency signals and an RFID tag in communication with the RFID reader. The RFID tag may have an antenna, an RFID chip having a radio frequency detector, a backscatter modulator, a logic block and a multiplexer. The RFID device may also have a display in communication with the multiplexer of the RFID chip.

According to another exemplary embodiment, a method for driving a display element may be shown. The method may include establishing communication between an RFID reader and an RFID tag and transmitting a waveform from the reader to the tag. The RFID tag may enter a pass through mode whereby a drive signal and waveform transmitted by the reader passes through a multiplexer of the RFID tag. The multiplexer may transmit a signal to a display as a direct function of the drive signal and waveform transmitted by the reader. Readable information may be shown on the display according to the signal transmitted from the multiplexer.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION OF THE EMBODIMENTS

Figure 1:
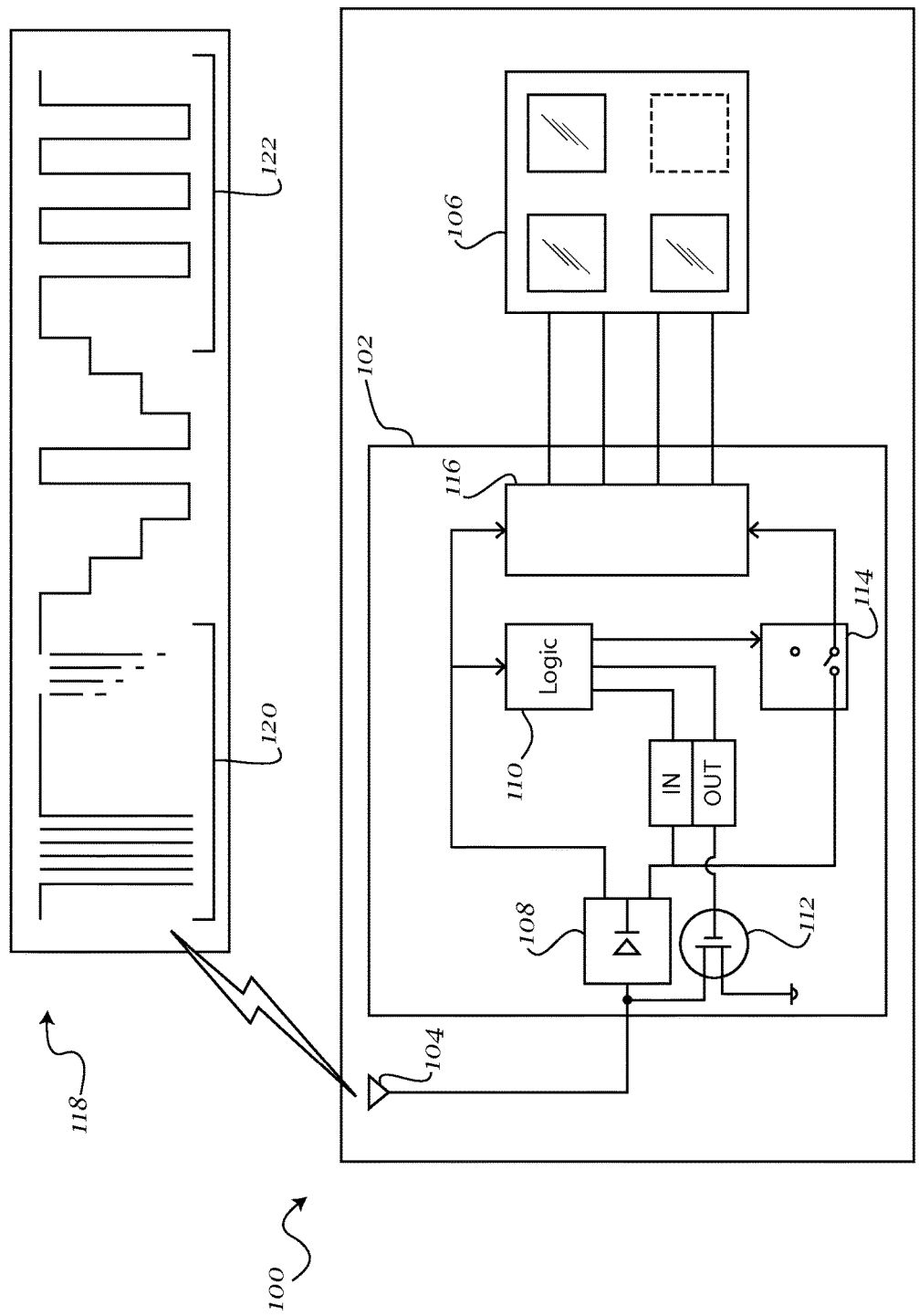
FIG. 1 is an exemplary embodiment of an REID device configured to drive a display element.

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

RFID technology is known in the art. Generally, an REID reader/writer may send out electromagnetic waves to one or more RFID tags that may induce a current in the antenna of a tag. The tag antenna may be tuned to receive these waves. A passive RFID tag may draw power from the field created by the reader/writer and may use the power to power a microchip's circuits. The chip may then modulate the waves that the tag sends back to the reader/writer to be converted into digital data. The tag could be powered and information exchanged through either inductive coupling or backscatter. RFID systems may use many different frequencies.

An RFID reader/writer may further be capable of wirelessly sending and receiving radio frequency (RF) signals with a display unit. The display unit may be a bi-stable display unit that may display an image and continue to retain the image without a sustained source of power. The REID reader/writer may further transmit updated or modified information to the display unit. The display unit may receive the RE signals and may process the signals utilizing power gained from the RE signals. The display unit may not require a local or internal power source and may derive power externally, for example from the received RF signals. The display device may need power only when the information displayed changes.

Referring now to FIG. 1, an exemplary embodiment of RFID device 100 configured to drive a display element may be shown. RFID device 100 may include an RFID chip 102 with antenna 104. Antenna 104 may be tuned to be in communication with an RF source, for example, but not limited to, an external portable or handheld reader. RFID device 100 may be a passive RFID tag that may draw power gained from a communication with the external source.

RFID device 100 may also have display 106 in communication with RFID chip 102. Display 106 may be, for example, a bi-stable display or display element, such as a zenithal bi-stable device, polymer stabilized cholesteric liquid crystal, electrophoretic materials, and the like. Together RFID chip 102 and display 106 may form an RFID tag. All communications of RFID device 100 may be, for example, wireless communication.

Still referring to exemplary FIG. 1, RFID chip 102 may have a detector 108. Detector 108 may be, for example, an RF detector and can include a diode, switching diode or diode array. Detector 108 may receive signals from an external source 118, for example RF signals from an external reader/writer. RFID chip 102 may also have logic block 110. Logic block 110 may process, decipher or otherwise handle signals received. RFID chip 102 may also have backscatter modulator 112. RFID chip 102 may exchange information with the external source 118, for example, by backscatter via backscatter modulator 112.

RFID chip 102 may further include a switch 114. Switch 114 may allow detected modulation from the external source 118 to pass through and be received by a multiplex driver, for example multiplexer 116. Multiplexer 116 may be a simple multiplexer using waveforms and timing communicated by the external source 118. Multiplexer 116 may communicate with display 106 to display readable information, for example, text, numbers, bar codes, symbols or other readable information.

Display 106 may be, for example and as described above, a bistable display that may continue to retain and maintain displayed information after communication between the external source 118 and the RFID chip 102 terminates or when power to display 106 is otherwise removed. Display 106 may not contain a local power source and may derive all power from signals received. Display 106 may be updated, modified or changed by transmission of additional information.

Still referring the FIG. 1, an exemplary operation of RFID device 100 includes establishing communication between an external source 118 and RFID chip 102, for example by any number of standard protocols as known in the art. External source 118 may transmit data that includes a communication portion 120. Communication portion 120 may be received by antenna 104 and detected by detector 108. Logic block 110 may process the communication portion 120 data and communicate with external source 118 through data sent through backscatter modulator 112.

External source 118 may also transmit data that includes a display drive portion 122, for example, drive signal and voltage/time waveforms. Switch 114 may allow the display drive portion 122 to pass through RFID chip 102 to multiplexer 116. Multiplexer 116 may then send a signal to display 106 as a direct function of the display drive portion 122. Display 106 may then display readable information obtained from the signal. As a result, the majority of any waveform synthesis may be performed by external source 118 communicating with RFID chip 102, as opposed to by physical components of RFID chip 102.

Figure 2:
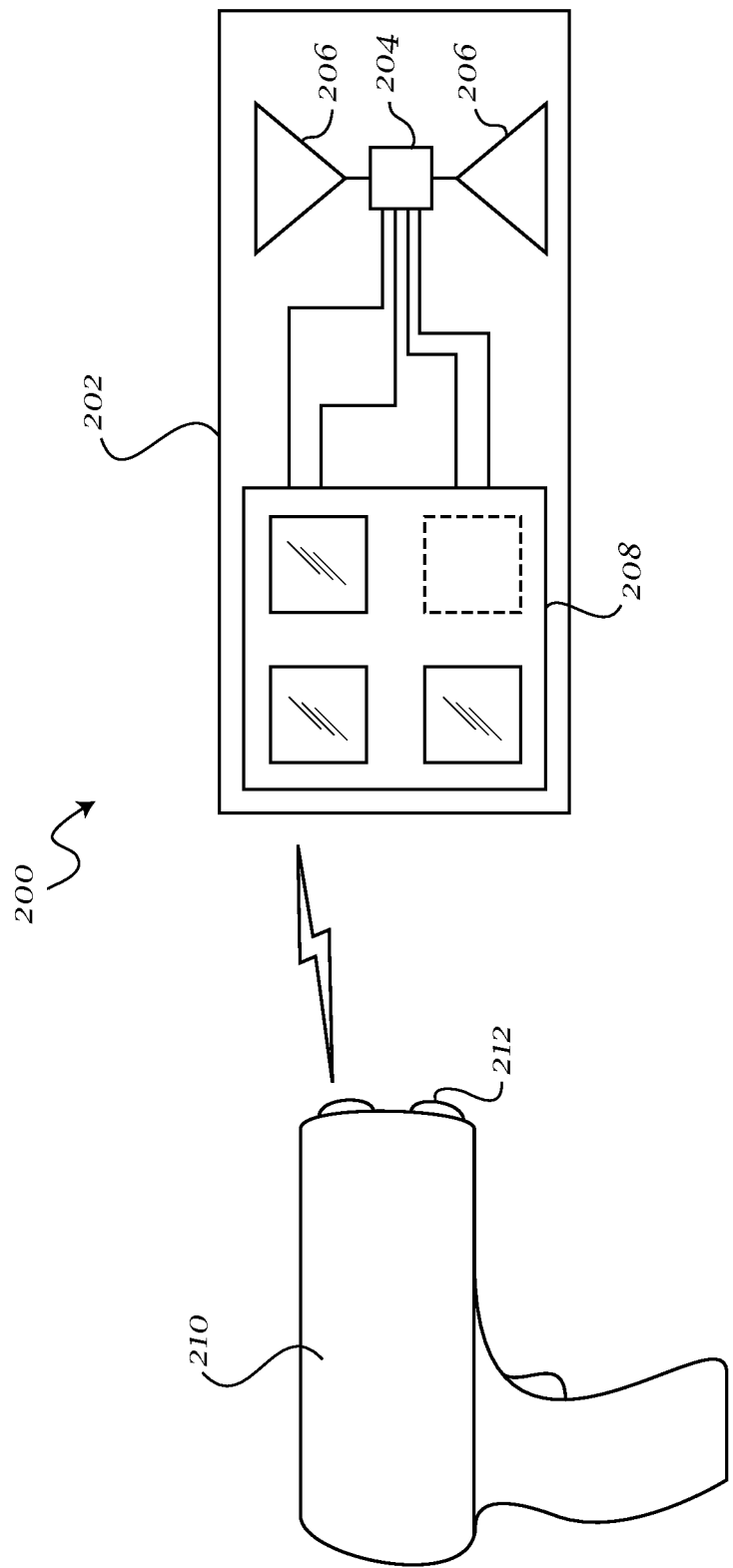
FIG. 2 is another exemplary embodiment of an RFID device configured to drive a display element.

Turning now to FIG. 2, another exemplary embodiment of an RFID device 200 configured to drive a display element may be shown. RFID device 200 may include an RFID tag 202. RFID tag 202 may have antenna 204, RFID chip 206 and bi-stable display 208. RFID tag 202 may receive a signal from reader 210, which may be a handheld or portable reader, or any other type of reader, as desired. Further, RFID device 200 may operate in a substantially similar manner to RFID device 100.

In the exemplary embodiment of FIG. 2, reader 210 may have a camera 212 or other optical device. Camera 212 may assess the state of bi-stable display 208 such that the signal provided to bi-stable display 208 via RFID chip 206 may be optimized. As a result, a particular result, for example a defined contrast, effect or color of the image or element displayed, may be achieved.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed:

1. A radio frequency identification (RFID) system configured to drive a display element, the RFID system comprising:
    an RFID reader capable of sending and receiving radio frequency (RF) signals, the RFID reader is a handheld reader device, and the handheld reader device includes a camera, and the camera provides at least one of a defined contrast, effect, color of an image or an element displayed;
    an RFID tag in communication with the RFID reader, said RFID tag comprising:
    an antenna;
    a chip having a radio frequency detector, a backscatter modulator, a logic block, a switch, and a multiplexer, wherein the switch is configured to selectively pass RF signals received from the RFID reader through to the multiplexer, and the multiplexer is configured to transmit a signal as a function of the RF signals received from the RFID reader; and
    an embedded display device in direct communication with the multiplexer of the chip configured to display readable information based on the signal transmitted by the multiplexer and a majority of waveform synthesis is performed by the RFID reader communicating with the chip; and the embedded display device obtains power from one of an internal power source or external signals that comprise a display drive portion; and the display device displays an image while continuing to retain the image without a sustained source of power; and
    where the RFID reader transmits updated or modified information to the display device which processes the signals utilizing power gained from the RF signals.

2. The RFID system of claim 1, wherein the embedded display device comprises an embedded bi-stable display.

3. The RFID system of claim 1, wherein the RFID tag is a passive RFID tag.

4. The RFID system of claim 1, wherein the RFID reader is one of a handheld or portable reader device.

5. The RFID system, of claim 1, wherein the embedded display device comprises an embedded liquid crystal display (LCD).

6. The RFID system of claim 1, wherein readable information comprises text, numbers, bar codes or other symbols.

7. The RFID system of claim 1, wherein the embedded display device receives power from the RF signals received from the RFID reader.

8. The RFID system of claim 1, wherein the RFID detector includes one of a diode, switching diode or diode array.

9. The RFID system of claim 1, wherein the external signals comprise a display drive portion to display readable information.

10. A method for driving a display element, the method comprising:
   receiving, by a radio frequency identification (RFID) tag, radio frequency (RF) signals of a first type from an external reader to establish communication between the external reader and the RFID tag, the RFID tag comprises an antenna, an RFID chip, and an embedded display device in communication with the RFID chip, and the RFID chip comprises a switch and a multiplexer;
   receiving, by the RFID tag, RF signals of a second type from the external reader, the RF signals of the second type comprise at least one waveform and drive signal from the external reader, wherein the RFID tag is powered by the RF signals of the second type received from the external reader;
   detecting, by the RFID chip, the RF signals of the second type received from the external reader;
   passing, by the switch, the waveform and drive signal of the detected RF signals of the second type through to the multiplexer of the RFID chip;
   transmitting, by the multiplexer, a signal directly to the embedded display device as a direct function of the waveform and the drive signal of the RF signals of the second type received from the external reader and the external reader includes a camera that assess the state of the embedded display device in order to optimize the signal provided to the display via the RFID chip, and the camera provides at least one of a defined contrast, effect, color of an image or an element displayed; and
   displaying, by the embedded display device, readable information according to the signal transmitted by the multiplexer;
      and the embedded display device obtaining power from an internal power source or external signal such that a majority of waveform synthesis is performed by the RFID reader communicating with the RFID tag; and the display device displays an image while continuing to retain the image without a sustained source of power; and
      where the RFID reader further transmits updated or modified information to the display device which processes the signals utilizing power gained from the RF signals.

11. The method of claim 10, further comprising:
   maintaining the displayed readable information after communication between the external reader and the RFID tag terminates.

12. The method of claim 10, wherein the RF signals of the second type comprise first RF signals of the second type; and further comprising:
   receiving, by the antenna, second RF signals of the second type from the external reader; and
   updating the embedded display device according to the received second RF signals of the second type.

* * * * *